UNITED STATES PATENT OFFICE.

ARTHUR BUTTERWORTH, ARTHUR BUTTERWORTH, JR., AND HAROLD BUTTERWORTH, OF ROCHDALE, ENGLAND.

CAM MECHANISM FOR OPERATING TOOL-SLIDES.

1,357,682. Specification of Letters Patent. Patented Nov. 2, 1920.

Application filed November 13, 1919. Serial No. 337,844.

*To all whom it may concern:*

Be it known that we, ARTHUR BUTTERWORTH, ARTHUR BUTTERWORTH, Junior, and HAROLD BUTTERWORTH, subjects of the King of Great Britain, residing at Rochdale, in the county of Lancaster and Kingdom of England, have invented certain new and useful Improvements in Cam Mechanism for Operating Tool-Slides, of which the following is a specification.

The present invention relates to improvements in machine tools such as lathes or the like turning machines, semi-automatic chucking machines and the like.

According to the present invention the feed of a cutting tool, such as for instance a parting tool, is operated from a cam drum, either directly by means of a pin engaging with cams on the drum or indirectly by means of a pivoted lever which may be of adjustable length to give a varying ratio of feed as compared with the cam height.

The present invention is more particularly described with reference to the accompanying drawings:—

Figure 1:
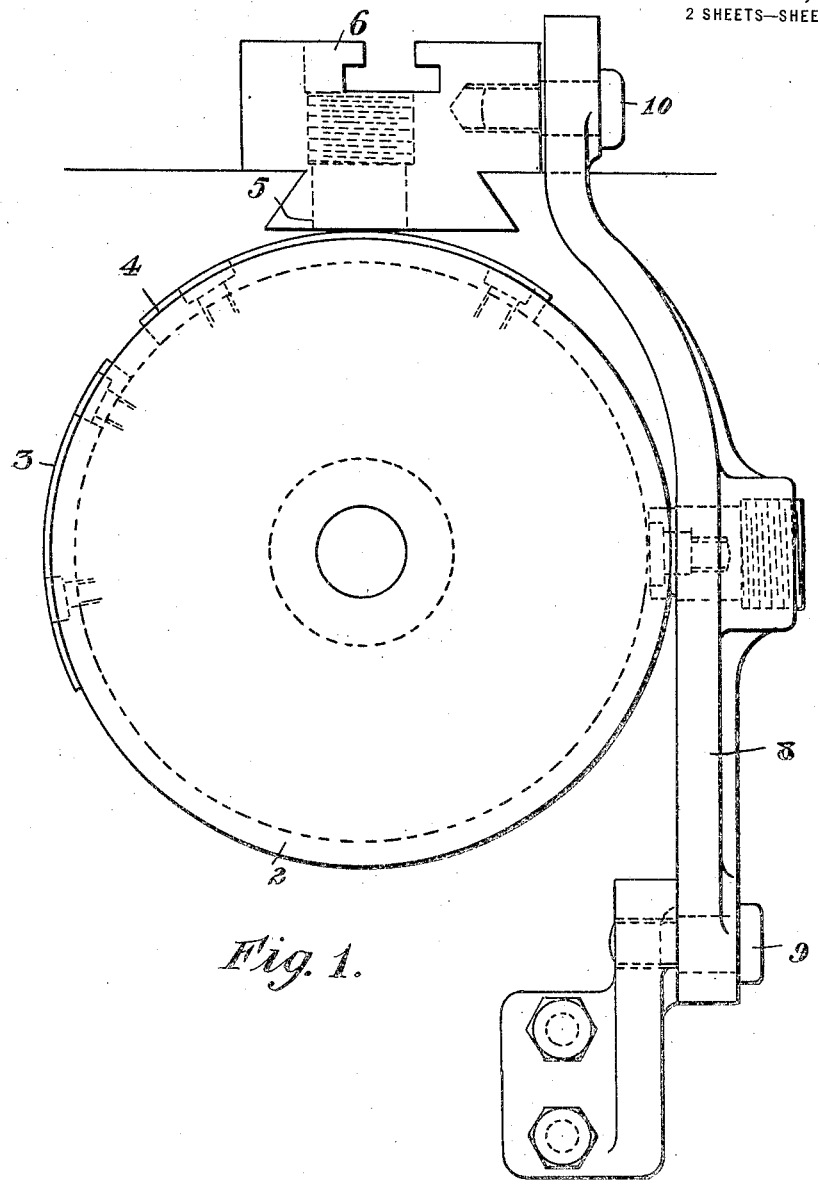
Figure 1 is an end view.
Figure 2:
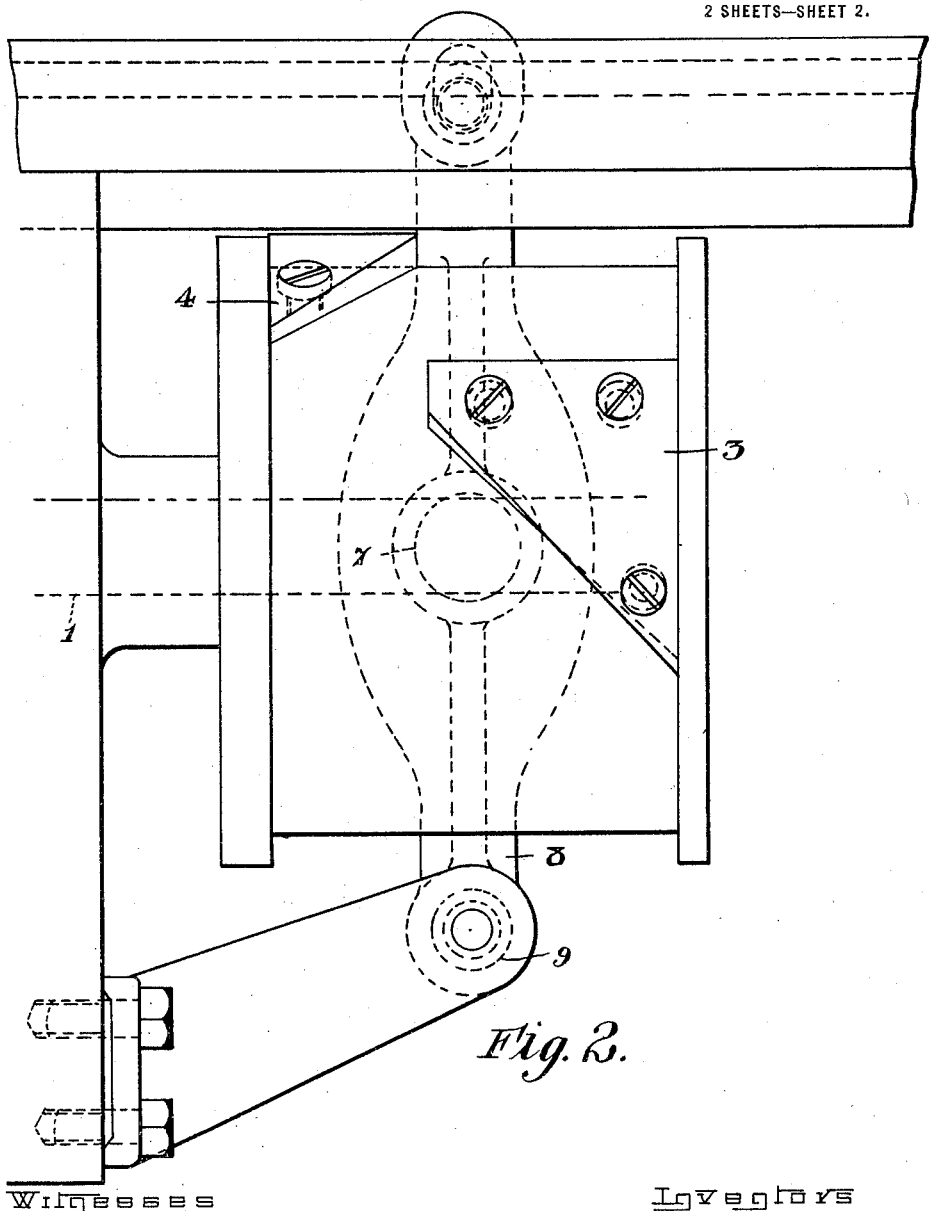
Fig. 2 is a side elevation.

A cross shaft 1 of a lathe or the like machine tool and driven in any suitable manner from the main driving shaft is provided with a drum 2 having cams 3, 4, mounted adjustably thereon, as desired and of a predetermined contour. These cams are adapted to be operated either directly with a roller fitted into the hole 5, on the cross slide 6 or indirectly on to the roller 7 when this is mounted intermediate its length to a pivoted lever 8 pivoted at 9 to the frame of the machine and connected to the cross slide 6 by a pin 10. If desired the connection 9 to the frame can be adjustable so that the ratio of displacement of the slide 6 as compared to the height of the cams 3, 4, can be varied. It is obvious that only one of the rollers 5 or 7 will be in operation at the one time.

The arrangement can be used for the traversing of any slide on the lathe or the like machine tool.

We declare what we claim is:—

1. A machine tool including in combination, a tool rest, a cam adapted to displace said tool rest, a pair of sockets on said tool rest, a pin adapted to be placed in either socket to give varying degrees of feed of tool from the same height cam.

2. A machine tool including in combination, a tool rest, a moving cam to traverse said tool rest, a pivoted lever connected to said tool rest, and means to either connect said tool rest directly with said cam to give a unit degree of traverse or indirectly through said pivoted lever to give a varying degree of traverse according to the position of engagement along said lever.

In witness whereof, we have hereunto signed our names this 15th day of September, 1919, in the presence of two subscribing witnesses.

ARTHUR BUTTERWORTH.
ARTHUR BUTTERWORTH, Junior.
HAROLD BUTTERWORTH.

Witnesses:
JOHN PRIOR,
ANNIE THOMAS.